No. 772,997. PATENTED OCT. 25, 1904.
N. T. & R. B. BENFORD.
BASTING AND ROASTING ATTACHMENT FOR BAKE PANS.
APPLICATION FILED JAN. 12, 1904.
NO MODEL. 2 SHEETS—SHEET 1.
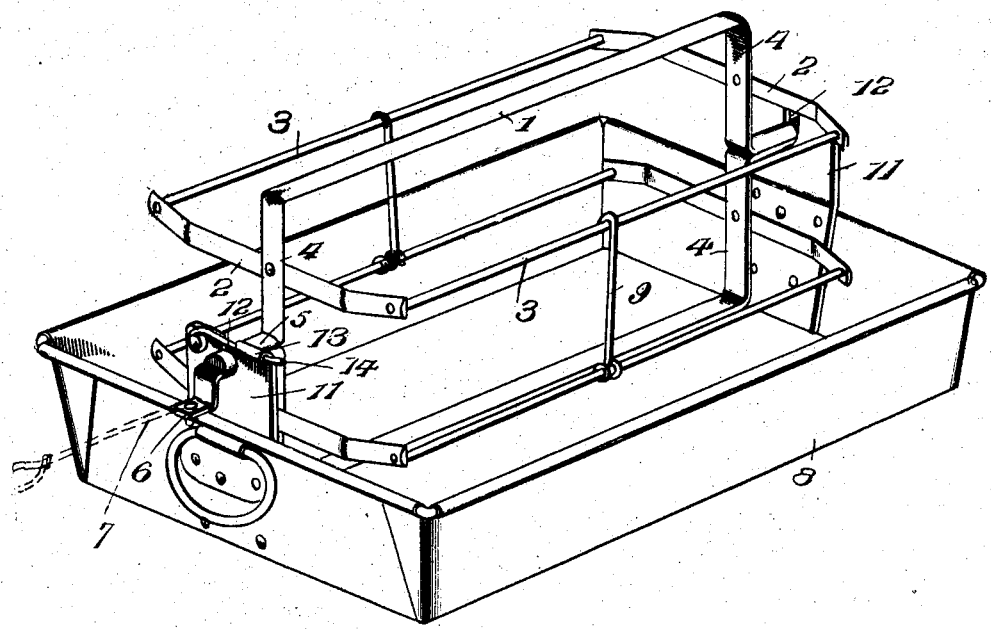
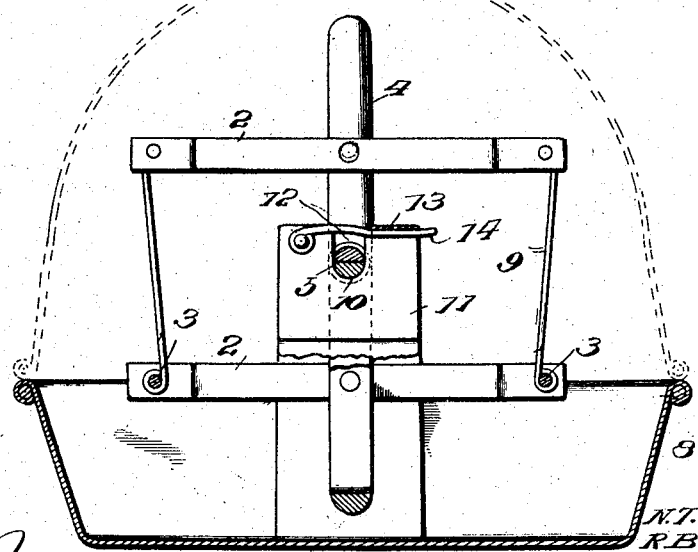
Inventors
N. T. Benford
R. B. Benford No. 772,997. PATENTED OCT. 25, 1904.
N. T. & R. B. BENFORD.
BASTING AND ROASTING ATTACHMENT FOR BAKE PANS.
APPLICATION FILED JAN. 12, 1904.
NO MODEL. 2 SHEETS—SHEET 2.
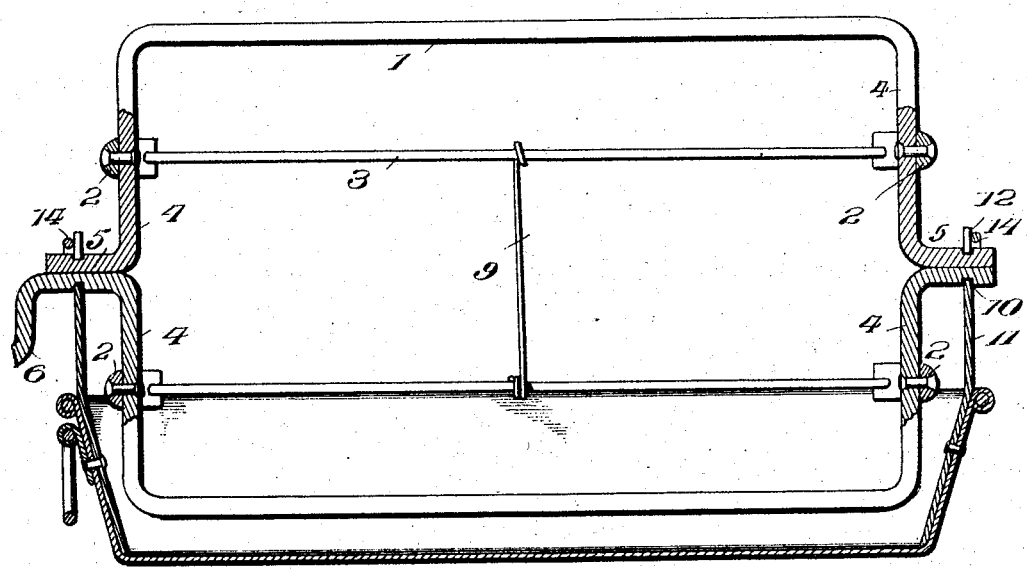
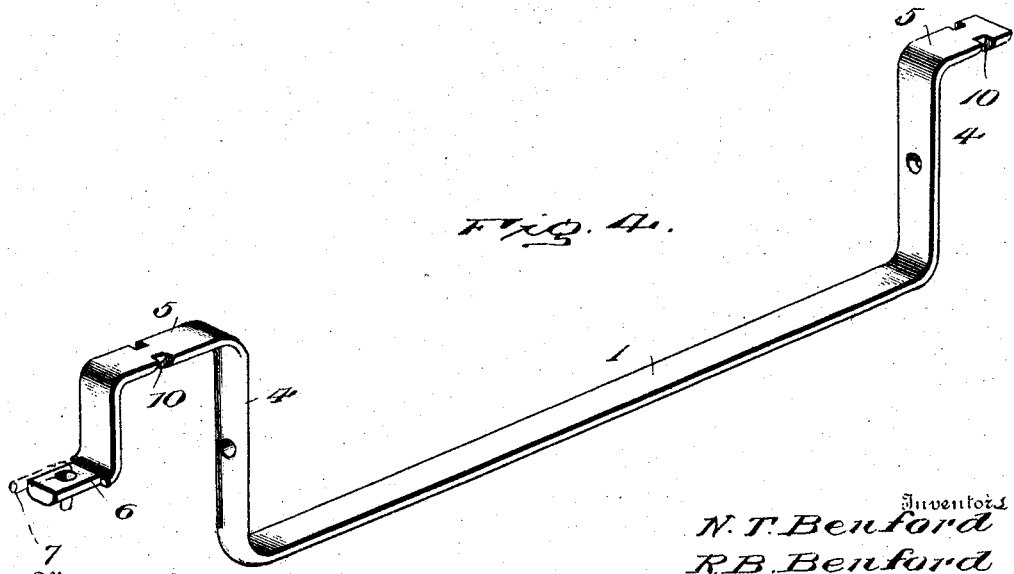
Witnesses
W. N. Woodson
Inventors
N. T. Benford
R. B. Benford
By R. S. & A. B. Lacy, Attorneys No. 772,997. Patented October 25, 1904.

UNITED STATES PATENT OFFICE.

NATHANIEL T. BENFORD AND REZIN B. BENFORD, OF SHARPSBURG, PENNSYLVANIA.

BASTING AND ROASTING ATTACHMENT FOR BAKE-PANS.

SPECIFICATION forming part of Letters Patent No. 772,997, dated October 25, 1904.

Application filed January 12, 1904. Serial No. 188,728. (No model.)

*To all whom it may concern:*

Be it known that we, NATHANIEL T. BENFORD and REZIN B. BENFORD, citizens of the United States, residing at Sharpsburg, in the county of Allegheny and State of Pennsylvania, have invented certain new and useful Improvements in Basting and Roasting Attachments for Bake-Pans, of which the following is a specification.

This invention provides novel means, in combination with a bake-pan, to enable meat or fowl to be turned and basted without necessitating the uncovering of the pan, thereby retaining the sweetness and flavor and preventing the loss thereof attendant upon the exposure of the meat during the process of baking in order to turn and baste the same.

The invention consists of the novel features and details of construction, which hereinafter will be more particularly set forth, illustrated, and finally claimed.

In the drawings hereto attached and forming a part of the specification, Figure 1 is a perspective view of a baster and roaster constructed in accordance with and embodying the essential features of the invention. Fig. 2 is a transverse section thereof, parts being broken away. Fig. 3 is a longitudinal section, parts being broken away. Fig. 4 is a perspective view of the main longitudinal bar of one of the sections of the cage.

Corresponding and like parts are referred to in the following description and indicated in all the views of the drawings by the same reference characters.

The cage for reception of the meat, fowl, or the like to be baked may be of any size and design and is composed of spaced elements suitably arranged and substantially connected. The cage is composed of two parts or sections separable longitudinally, each section being a counterpart of the other and composed of a main bar 1, end bars 2, and longitudinal bars or rods 3, connecting the ends of the bars 2. The main bar 1 has its end portions bent approximately at a right angle, as shown at 4, thence outwardly, as shown at 5, to form journal members. One of the journal members of a section terminates in a crank 6, which projects beyond the bake-pan for application thereto of a suitable implement 7, by means of which the cage may be turned when required either for basting or bringing new portions of the meat or fowl into position for browning. The journal members 5 of the sections unitedly constitute the journals upon which the cage turns when rotated. The end bars 2 are arranged at a right angle to the bent ends 4 and are riveted or otherwise rigidly attached thereto, and their terminal portions are bent inward at a slight inclination, so as to clear the inclined ends of the pan 8, to which the cage is journaled. The longitudinal rods or bars 3 have their ends let into openings near the extremities of the end bars 2 and are secured thereto by riveting or other substantial manner. The sections or parts are held together by means of hooks 9 or analogous connecting means, the same being loosely mounted upon the rods or bars 3 of one section intermediate the ends of same and adapted to engage with corresponding rods or bars of the other section. These hooks 9 coöperate to support that which is inclosed by the cage in a manner which will be readily comprehended. The journals of the cage are formed with annular grooves 10 to receive a portion of the uprights or standards 11, bordering upon the notches 12, provided in the upper ends of said standards for reception of the journals. This construction provides positive interlocking connection between the journals and the standards 11 and prevents any longitudinal movement of the cage with reference to the pan 8, and likewise prevents either inward or outward displacement of the standards 11.

The standards 11 may be of any formation and in the preferable construction consist of pieces of sheet metal riveted or otherwise attached to the ends of the pan 8, the upper ends of the standards being notched, as indicated at 12, to provide bearings for reception of the journals of the cage. A portion of each of the standards 11 at one side of the notches or bearings 12 is bent to provide a keeper 13 for engagement with the free end of the latch 14, secured to the opposite portion of the other side of the notch 12. The latch 14 closes the open end of the notch or bearing 12 and holds the journal therein and is connected to the standard at one end in any determinate way and is adapted to be engaged at the opposite end by means of the keeper 13.

The pan 8 may be fitted with a cover constructed to make a close joint therewith and having an opening at one end for the passage of the crank 6, or said pan and attached parts may be arranged within a double bake-pan of any type, notches being formed in the meeting ends of the parts to receive the journal of the cage having the crank 6, so that the latter may be projected beyond the bake-pan for application thereto of the implement 7 or other means whereby the cage may be turned as may be required for proper basting and roasting.

When it is required to place the meat, fowl, or the like within the cage, the parts 9 and 14 are loosened and the sections of the cage separated, and after the meat has been placed in position and the parts of the cage properly brought together they are secured by the fastenings 9 and 14 in the manner stated. Prior to covering the cage and pan the latter is supplied with water in the usual way, so as to keep the meat moist and assist the baking process. The basting is accomplished by turning the cage so as to bring the upper portion of the meat in position to pass through the liquid contained in the pan 8, said operation, as stated, being accomplished without exposing the meat, thereby retaining all the sweetness, flavor, and juices.

Having thus described the invention, what is claimed as new is—

1. A basting and roasting attachment for bake-pans comprising a cage composed of similar sections, each section comprising a main bar having its end portions bent about at a right angle and provided with journal members, end bars connected at points between their extremities to the bent ends of the main bars aforesaid, longitudinal rods or bars connecting the terminal portions of said end bars, and hook devices loosely mounted upon the longitudinal bars of one of the sections and adapted to engage the corresponding longitudinal bars of the other section.

2. A basting and roasting attachment for bake-pans comprising a cage composed of similar sections, each section comprising a main bar having its end portions bent about at a right angle and provided with journal members, end bars connected at points between their extremities to the bent ends of the main bars aforesaid, longitudinal rods or bars connecting the terminal portions of said end portions, hooks loosely mounted upon the longitudinal bars of one of the sections and disposed about intermediate the ends of said bars, said hooks being adapted to engage with the corresponding longitudinal bars of the other section.

3. A basting and roasting attachment for bake-pans, the same comprising a cage composed of similar sections, each section comprising a main bar having its end portions bent about at a right angle, thence outwardly to form journal members, which unitedly constitute journals, end bars connected intermediate of their extremities to the bent ends of the main bars, and longitudinal rods or bars connecting the terminal portions of said end bars, substantially as set forth.

In testimony whereof we affix our signatures in presence of two witnesses.

NATHANIEL T. BENFORD. [L. S.]
REZIN B. BENFORD. [L. S.]

Witnesses:
JOHN KRAUS,
EDW. A. KRAUS.